Sept. 21, 1948.                A. LA RICCIA ET AL                2,449,607
                                  PIPE COUPLING
                               Filed Sept. 18, 1945
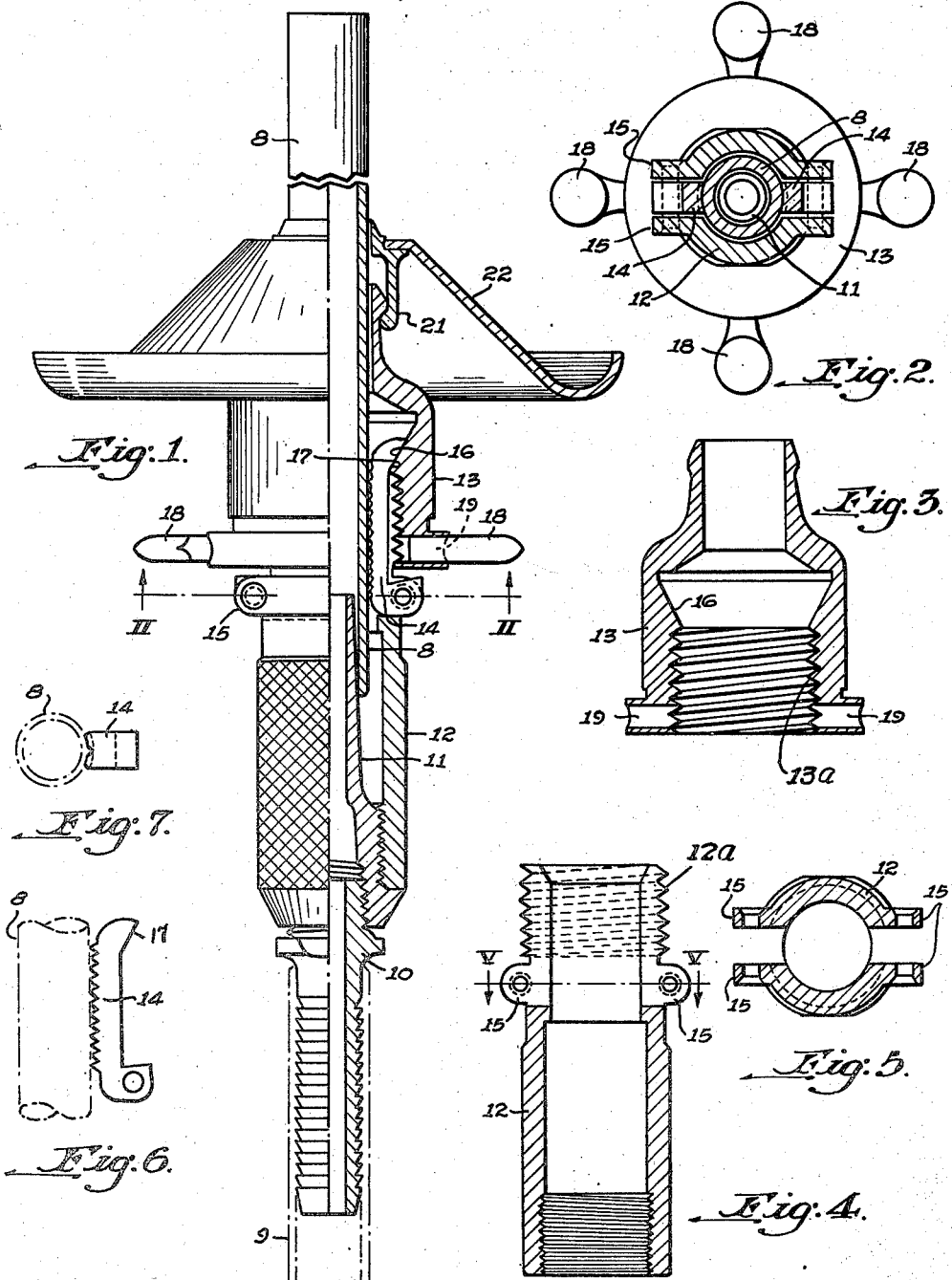
INVENTORS
Anthony La Riccia
and Thomas W. Plante
BY
Stebbins, Blenko & Webb
ATTORNEYS Patented Sept. 21, 1948

2,449,607

UNITED STATES PATENT OFFICE 2,449,607

PIPE COUPLING

Anthony La Riccia, Cleveland Heights, and
Thomas W. Plante, Cleveland, Ohio

Application September 18, 1945, Serial No. 617,002

8 Claims. (Cl. 285—171)

Our invention relates to pipe couplings and is here shown and described as employed in an arrangement that is particularly suitable in the operation of lancing or the burning open of the tap holes or pouring notches of melting furnaces. It will be understood, however, that the invention is capable of use in various other ways.

In open-hearth operations, the opening of the tapping holes or pouring notches by the use of an oxygen flame is termed "lancing." Similarly, in blast furnace operations, lancing is frequently used to burn through tapping holes or cinder notches, for salamander removal, for cutting skull at tuyères or cooling plates, or for various kindred operations.

The usual practice is to force oxygen through a flexible hose into a metal pipe that may be either bent or straight and which functions as a burner nozzle. These burner-pipes may be of various diameters but are usually about one inch or smaller. The gas is ignited at the discharge end of the pipe and the flame directed against the material or object to be burned, the fuel gas being constantly supplied through the hose and pipe. Owing to the intense heat, a considerable portion of the burning-pipe is consumed during the operation and the unconsumed shorter portion thereof becomes hot so that often one or more changes of burner-pipes must be made during a lancing operation. By previous practices, such change required considerable time and frequently tools were needed, the usual replacement operation requiring the unscrewing of the partly burned pipe from the coupling and the screwing of a new section into place.

One object of our invention is to provide a coupling arrangement of such form that a pipe may be more quickly and tightly connected to another pipe than by various means heretofore known in the art.

Another object of our invention is to provide means for quickly removing a hot burner-pipe out of coupled engagement with a fuel-supply line and to substitute a new burning-pipe, without the necessity of using tools, such as wrenches or the like.

In the accompanying drawings which illustrate a preferred embodiment of our invention:

Figure 1 is a side view of the coupling apparatus, partly in section;

Figure 2 is a view taken on the line II—II of Figure 1;

Figure 3 is a longitudinal sectional view through one of the housing and coupling members of Figure 1;

Figure 4 is a side view, partly in section, of another coupling element and housing member of Figure 1;

Figure 5 is a view taken on the line V—V of Figure 4;

Figure 6 is a side view of one of the gripping jaws of Figure 1, and

Figure 7 is a plan view thereof.

The pipe which functions as a burner is shown at 8 while the fuel-supply line is indicated at 9. A gas hose nipple of conventional form is shown at 10, partly in elevation and partly in section. This nipple 10 has threaded engagement with a nozzle 11 that tapers somewhat and with which the inner end of the burning-pipe 8 has snug fit, these elements 8 and 11 being detachably held in such snug fitting engagement by the apparatus hereinafter described.

The nozzle 11 has threaded connection with a housing and coupling member 12. The member 12 is threaded at its upper end as at 12a to cooperate with threads 13a of a second housing and coupling member 13. A pair of gripping jaws 14 are positioned in slots in the member 12 and are pivotally mounted between perforated ears 15 that are formed on the housing member 12, the inner faces of these jaws being serrated to firmly grip the pipe 8 when they are forced into engagement therewith.

The housing member 13 has an annular inclined shoulder surface 16 in position to engage an inclined surface 17 on each of the jaws 14, to exert a camming action that moves the jaws against the pipe 8 when the member 13 is turned in one direction relative to the member 12. Studs 18 are driven into holes or sockets 19 in the member 13 and serve as handles for turning such member.

When the coupling member 13 is in withdrawn or somewhat retracted position with respect to the member 12, allowing the jaws 14 to swing outwardly on their pivots, the pipe 8 can be withdrawn and a new pipe inserted, the pipe being pushed snugly against the nozzle 11. Thereupon the coupling member 13 will be rotated in a direction to move it outwardly on the member 12, thus bringing the inclined surfaces 16 and 17 into engagement with one another and causing the jaws 14 to be forced into gripping engagement with the pipe. A reverse operation of the member 13, of course, permits removal of the pipe 8.

In order to disassemble the coupling structure, the pipe 8 will be removed, whereupon the jaws 14 can swing inwardly far enough to permit complete unscrewing of the member 13 from the member 12. A collar 21 is carried by the member 13 and serves as a support for a sheet metal shield 22 that will be used when it is desired to protect the hands of the operator against the heat of a flame.

The invention is not limited to the preferred embodiment but may be otherwise embodied within the scope of the following claims.

We claim:

1. A coupling comprising a nozzle adapted for connection at its rear end to a fluid-supply pipe and for detachable seating engagement at its front end with a second pipe, a coupling member connected to the nozzle, gripping elements pivoted to said coupling member and movable radially thereof into position to engage the outer surface of said second pipe, and means movable axially on said coupling member to force the gripping elements into tight engagement with said second pipe.

2. A coupling comprising a nozzle adapted for a normally fixed connection at its rear end to a fluid-supply pipe and for detachable seating engagement at its front end with a second pipe, a first coupling member connected at its inner end to the nozzle at a rearwardly-located point thereon, gripping elements pivoted to said first coupling member and movable radially thereof into position to engage the outer surface of said second pipe, camming surfaces on the outer sides of the gripping elements, and a second coupling member rotatable on and movable axially of said first coupling member and having a camming surface engageable with the camming surfaces of the gripping elements and so arranged as to force the gripping elements into tight engagement with said second pipe.

3. A coupling comprising a nozzle adapted for a normally fixed connection at its rear end to a fluid-supply pipe and for detachable seating engagement at its front end with a second pipe, a coupling member connected at its inner end to the nozzle at a rearwardly-located point thereon, gripping elements pivoted to said coupling member and movable radially thereof into position to engage the outer surface of said second pipe, and means movable axially on said coupling member to force the gripping elements into tight engagement with said second pipe, the seating surface on one of the detachably-engaged members being tapered in an axial direction and having telescopic fit with the seating surface on the other member.

4. A coupling for fluid-supply lines, comprising a nozzle adapted for connection at its inner end to a fluid-supply pipe and tapering toward its outer end, for snug telescopic engagement with a second pipe, a tubular housing member connected to the inner end of the nozzle and surrounding the tapered portion of the nozzle in radially-spaced relation thereto, gripping jaws pivotally mounted on the housing member, for movement toward the axis thereof and having camming surfaces protruding beyond the outer end of the member, a second housing member of tubular form, having threaded engagement with the outer end of the first-named housing member, and having a camming surface engageable with the camming surfaces of the jaws, all of the camming surfaces being so arranged that the jaws are forced inward into gripping engagement with the second pipe when the second housing member is rotated in one direction relative to the first-named housing member.

5. A coupling comprising a nozzle adapted for a normally fixed connection at its rear end to a fluid-supply pipe and for detachable seating engagement at its front end with a second pipe, a coupling member connected at its inner end to the nozzle at a rearwardly-located point thereon, gripping elements pivoted to said coupling member and movable radially thereof into position to engage the outer surface of a second pipe that has seating engagement with the said nozzle, and means movable axially on said coupling member to force the gripping elements into tight engagement with said second pipe, the gripping elements being located in diametrally-opposed relation.

6. A coupling comprising a nozzle adapted for a normally fixed connection at its rear end to a fluid-supply pipe and for detachable seating engagement at its front end with a second pipe, a coupling member connected at its inner end to the nozzle at a rearwardly-located point thereon, gripping elements pivoted to said coupling member and movable radially thereof into position to engage the outer surface of a second pipe that has seating engagement with said nozzle, and means movable axially on said coupling member to force the gripping elements into tight engagement with said second pipe, the gripping elements being located in diametrally-opposed relation and each being in the form of a finger pivotally supported at one end on said coupling member and having a camming surface adjacent to its other end, engageable by said axially movable means.

7. A coupling comprising a nozzle adapted for a normally fixed connection at its rear end to a fluid-supply pipe and for detachable seating engagement at its front end with a second pipe, a coupling member connected at its inner end to the nozzle at a rearwardly-located point thereon, gripping elements carried by said coupling member and movable radially thereof into position to engage the outer surface of a second pipe that has seating engagement with said nozzle, and means movable axially on said coupling member to force the gripping elements into tight engagement with said second pipe, the gripping elements being located in diametrally-opposed relation and each being in the form of a finger extending generally parallel to the axis of said coupling member, and pivotally supported at one end on the coupling member and having a camming surface adjacent to its other end, engageable by said movable means.

8. A coupling comprising a nozzle adapted for a normally fixed connection at its rear end to a fluid-supply pipe and for detachable seating engagement at its front end with a second pipe, a coupling member connected at its inner end to the nozzle at a rearwardly-located point thereon, gripping elements pivoted to the coupling member and movable radially thereof into position to engage the outer surface of a second pipe that has seating engagement with said nozzle, and means movable axially on said coupling member to force the gripping elements into tight engagement with said second pipe, the gripping elements being located in diametrally-opposed relation and each being in the form of a finger extending generally parallel to the axis of the coupling member and projecting beyond the outer end thereof, and being pivotally supported at its inner end on the coupling member, and having a camming surface near its outer end, engageable by said axially movable means.

ANTHONY LA RICCIA.
THOMAS W. PLANTE.

REFERENCES CITED

The following references are of record in the file of this patent:

UNITED STATES PATENTS

| Number | Name | Date |
|---|---|---|
| 910,416 | Reed | Jan. 19, 1909 |
| 1,012,121 | Beauchesne | Dec. 19, 1911 |
| 1,586,276 | Woodruff | May 25, 1926 |
| 1,599,998 | Heck | Sept. 14, 1926 |